United States Patent [19]
Lara et al.

[11] Patent Number: 5,594,574
[45] Date of Patent: Jan. 14, 1997

[54] LCD MULTI-AXIS FLOATING MOUNT

[75] Inventors: Manuel Lara; Mark Woytassek, both of Cedar Rapids, Iowa

[73] Assignee: Rockwell International Corp., Seal Beach, Calif.

[21] Appl. No.: 347,775

[22] Filed: Nov. 30, 1994

[51] Int. Cl.⁶ .................................................. G02F 1/1333
[52] U.S. Cl. ................................................ 349/58; 361/681
[58] Field of Search ............................. 359/83; 361/681; 348/836

[56] References Cited

U.S. PATENT DOCUMENTS

| | | | |
|---|---|---|---|
| 4,545,647 | 10/1985 | Sasaki et al. | 359/83 |
| 5,038,142 | 8/1991 | Flowers et al. | 341/34 |
| 5,202,768 | 4/1993 | Oboza et al. | 358/247 |
| 5,270,847 | 12/1993 | Sano | 359/83 |
| 5,363,227 | 11/1994 | Ichikawa et al. | 359/83 |

FOREIGN PATENT DOCUMENTS 61-130944  6/1986  Japan.

Primary Examiner—William L. Sikes
Assistant Examiner—Charles Miller
Attorney, Agent, or Firm—Gregory G. Williams; M. Lee Murrah; G. A. Montanye

[57] ABSTRACT

Newton rings on a liquid crystal display (LCD) are avoided by connecting the frame of the LCD to the chassis without deflecting the frame outward toward the chassis. A first connecting mechanism coupled to the frame and to the chassis at least partially secures the frame to the chassis by prohibiting movement of the frame relative to the chassis in a first direction, but allows at least partial movement of the frame relative to the chassis in a second direction non-parallel to the first direction. A second connecting mechanism coupled to the frame and to the chassis at least partially secures the frame to the chassis by prohibiting movement of the frame relative to the chassis in the second direction, but allows at least partial movement of the frame relative to the chassis in the first direction. In combination, the coupling mechanisms prohibit movement of the frame relative to the chassis in both the first and second directions.

20 Claims, 4 Drawing Sheets

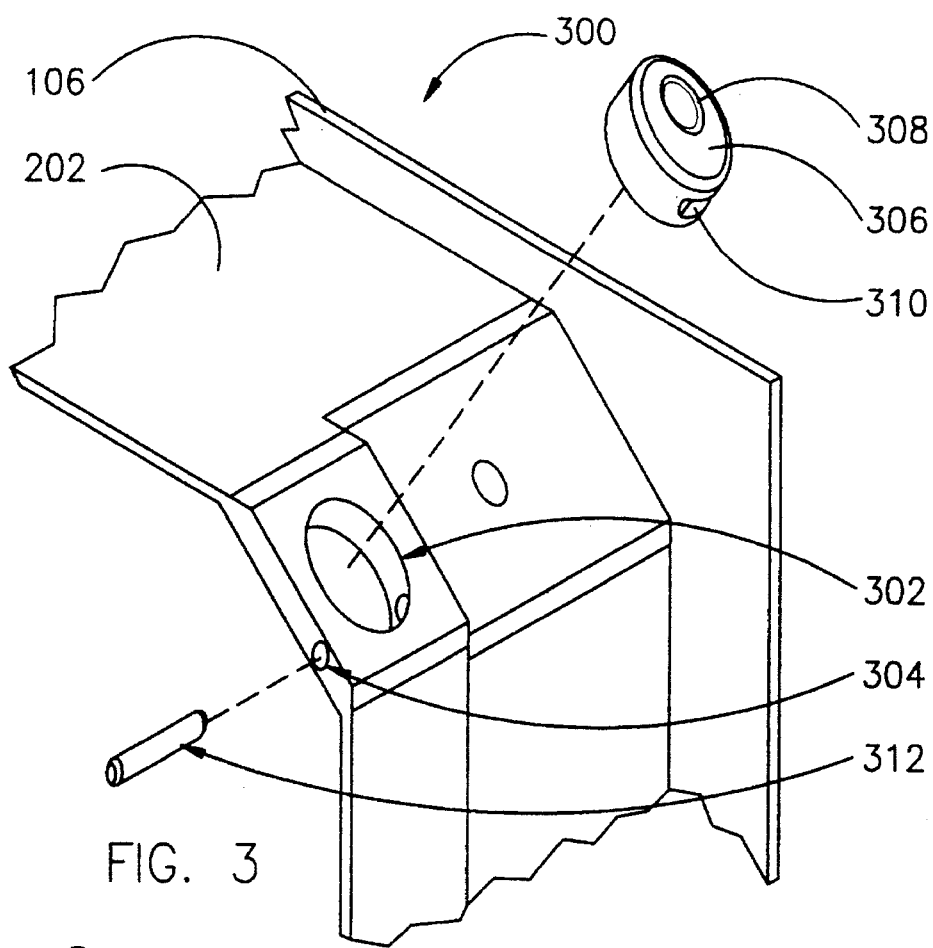
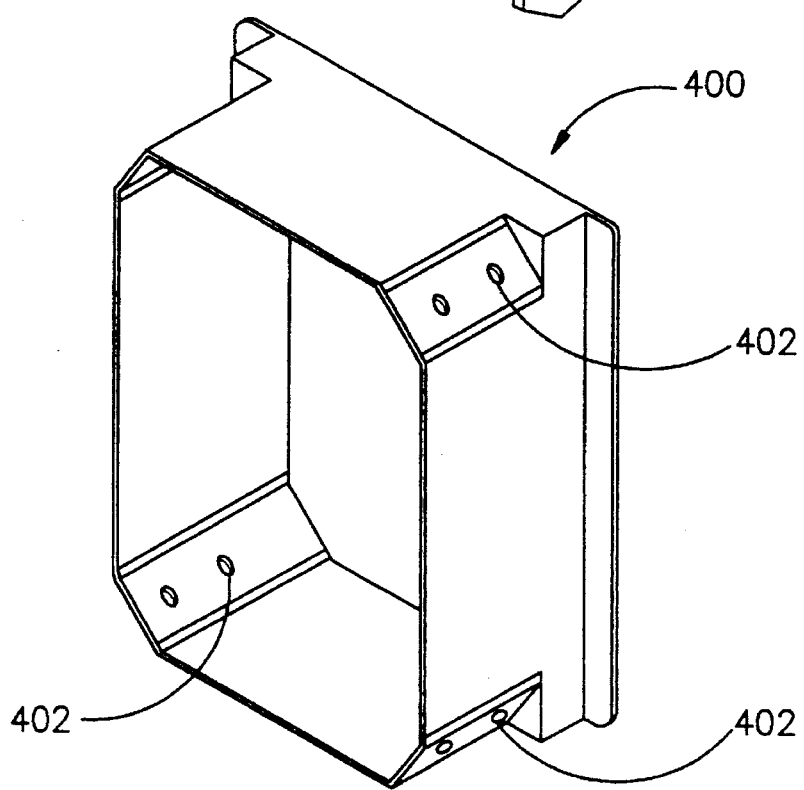

LCD MULTI-AXIS FLOATING MOUNT

BACKGROUND OF THE INVENTION

The present invention relates to displays, and more particularly to an improved mount for securing a liquid crystal display frame to a chassis.

Liquid crystal displays (LCDs) operate by reducing the transmissibility of light through a thin layer of liquid crystalline material (hereinafter referred to as the "liquid crystal") when an electric field is applied. Since the reduced transmissibility effect is localized, shapes and characters can be drawn on an LCD by carefully controlling the application of the electric field. The liquid crystal of an LCD is sensitive to external forces and stresses which can degrade its visual output. Deflection of the liquid crystal caused by the application of external forces may result in a phenomenon known as "Newton rings". Newton rings may be multi-colored or rainbow type distortion visible on the LCD when such a deflection of the liquid crystal occurs. The existence of Newton rings is undesirable, and in many cases unacceptable.

Typically, the liquid crystal of an LCD is secured to an LCD frame. The LCD frame supports the liquid crystal and other components such as light filters and protective windows. The LCD frame is adapted to be received into and supported by a chassis. To satisfy manufacturing tolerance requirements and to facilitate ease of assembly, a designed gap or clearance exists between the chassis and the frame when the frame is inserted into the chassis. In most applications, such as use of the LCD in an aircraft cockpit, existence of this gap allows unacceptable movement and shifting of the liquid crystal and frame. Therefore, the LCD frame must be secured to the chassis.

Typically, the LCD frame is rigidly secured to the chassis with mounting hardware, such as screws or nuts and bolts, positioned around the LCD at various locations. As the hardware is tightened, the LCD frame deflects outward toward the chassis to eliminate the gap between the two components. As the LCD frame deflects outward, the stresses are transferred to the liquid crystal and Newton rings result.

Consequently, a need exists for an improved LCD in which the frame can be secured to the chassis without causing Newton rings to develop.

SUMMARY OF THE INVENTION

It is an object of the present invention to provide an LCD without Newton rings on the liquid crystal. It is a further object of the invention to provide a method and apparatus for securing a display frame to a chassis without causing deflection of the frame toward the chassis.

A feature of the present invention is that the disclosed LCD has a frame securely mounted to a chassis without causing Newton rings. More specifically, the LCD includes a liquid crystal connected to and supported by the frame. The chassis is adapted for receiving the frame, and thereby supports the frame and the liquid crystal. A first connecting mechanism is coupled to the frame and to the chassis to at least partially secure the frame to the chassis by prohibiting movement of the frame relative to the chassis in a first direction. However, the first connecting mechanism allows at least partial movement of the frame relative to the chassis in a second direction non-parallel to the first direction. By allowing at least partial movement of the frame relative to the chassis in the second direction, the first connecting mechanism prevents the frame from deflecting outward toward the chassis in the second direction as a result of the first connecting mechanism being coupled between the frame and the chassis.

BRIEF DESCRIPTION OF THE DRAWINGS

The invention may be more fully understood by reading the following description of a preferred embodiment of the invention in conjunction with the appended drawings wherein:

FIG. 3 is a partial view in perspective and with portions exploded of an LCD frame and mount in accordance with preferred embodiments of the present invention;

FIG. 4 is a perspective view of a chassis adapted for use with the frame and mount shown in FIG. 3;

DESCRIPTION OF THE PREFERRED EMBODIMENT

Figure 1:
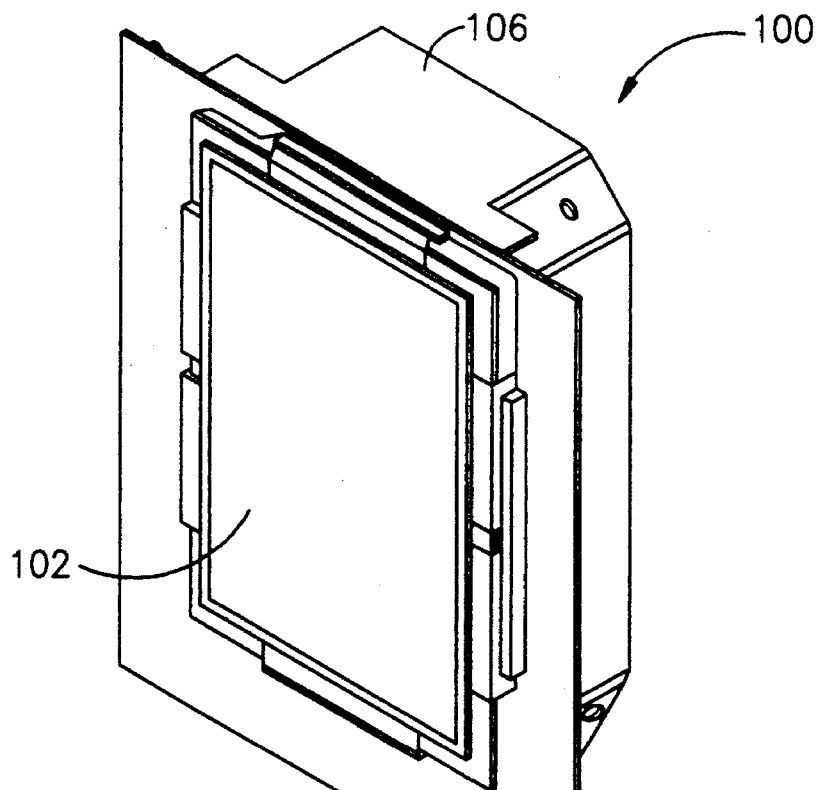
FIG. 1 is a front perspective view of a prior art LCD.
Figure 2:
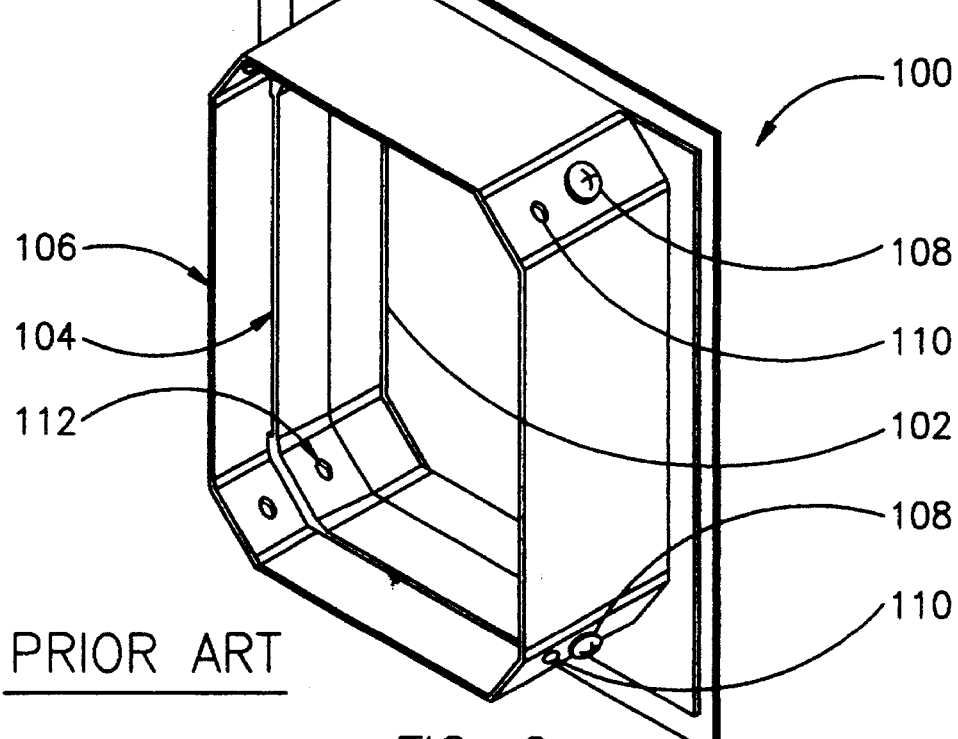
FIG. 2 is a rear perspective view of the prior art LCD shown in FIG. 1, utilizing previously existing methods of rigidly mounting the LCD frame to the chassis.

FIGS. 1 and 2 are front and rear perspective views of prior art LCD assembly 100. Prior art LCD assembly 100 includes liquid crystal 102, frame 104, chassis 106, screws 108, holes or apertures 110 in chassis 106, and holes or apertures 112 in frame 104.

Liquid crystal 102 is connected to and supported by frame 104. Frame 104 is, in turn, adapted to be inserted into and supported by chassis 106. As such, frame 104 must be sufficiently smaller in dimension than chassis 106 to accommodate necessary design tolerances and to facilitate ease of assembly.

Screws 108 extend through holes 110 in chassis 106 and holes 112 in frame 104 to secure frame 104 to chassis 106. While mounting frame 104 and liquid crystal 102 to chassis 106, screws 108 are tightened, deflecting frame 104 outward toward chassis 106. This deflection of frame 104 results in forces being transferred to liquid crystal 102, which in turn causes deflection of liquid crystal 102. The stresses on liquid crystal 102 cause the undesirable occurrence of Newton rings on the display.

FIG. 3 illustrates frame 300 in accordance with preferred embodiments of the present invention. Frame 300 is adapted for use with a floating mount which connects frame 300 to a chassis while eliminating or greatly reducing the likelihood that Newton rings will appear on the liquid crystal. In preferred embodiments, frame 300 includes four fastener receiving voids or apertures 302 and four pin receiving holes or apertures 304. Fastener receiving voids 302 preferably create passageways through frame 300. Each of pin receiving holes 304 extends into frame 300 in a direction non-parallel to a corresponding one of voids 302 such that each hole 304 at least partially intersects the corresponding void 302.

Included with frame 300 are four fasteners 306. Fasteners 306 are adapted to be received in each of voids 302. Each fastener 306 includes a threaded member receiving hole or aperture 308 extending at least partially therethrough and a pin receiving void or groove 310. As will be discussed later in greater detail, holes 308 are preferably positioned off-center in fasteners 306 to create a cam mechanism.

When properly aligned in one of fastener receiving voids 302, groove 310 of a particular fastener is aligned with the corresponding one of pin receiving holes 304. One of pins 312 is inserted into each of the aligned pairs of holes 304 and grooves 310 to movably secure fasteners 306 in voids 302 and to at least partially prohibit rotation of fasteners 306 in voids 302. The dimensions of grooves 310 are sufficiently larger than those of pins 312 so that fasteners 306 can move to some degree inward and outward in voids 302.

FIG. 4 illustrates chassis 400 in accordance with preferred embodiments of the present invention. Chassis 400 is adapted for receiving and supporting frame 300. As such, the dimensions of chassis 400 are larger than those of frame 300 to provide the clearance necessary to insert frame 300 into chassis 400. Chassis 400 includes threaded member receiving apertures or openings 402. Openings 402 are spaced apart on chassis 400 such that, when frame 300 is inserted into chassis 400, openings 402 will be aligned with threaded member receiving holes 308 in each of fasteners 306.

Figure 5:
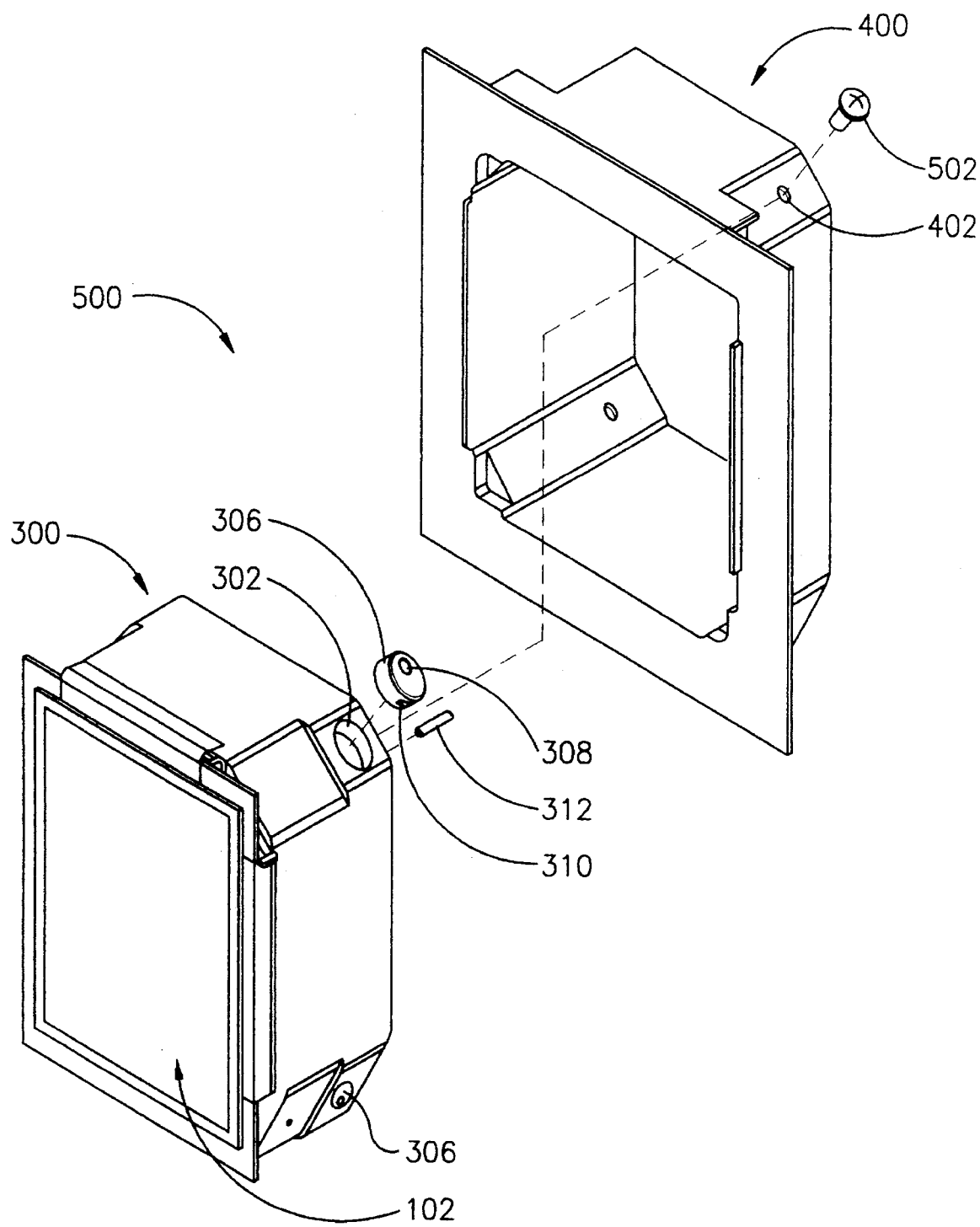
FIG. 5 is a perspective view with portions exploded of the LCD and mount of the present invention.

FIG. 5 is a perspective view of LCD assembly 500 with portions exploded to illustrate the improved mount of the present invention. As described above, prior to insertion of frame 300 into chassis 400, each of fasteners 306 is inserted into one of fastener receiving voids 302. Then, one of pins 312 is inserted into each of pin receiving holes 304 to movably couple fasteners 306 to frame 300.

After each fastener 306 is movably secured in one of fastener receiving voids 302, frame 300 is inserted into chassis 400. At this point, each of holes 308 in fasteners 306 is aligned with one of openings 402 in chassis 400. Each of threaded members 502 is inserted through one of corresponding openings 402 in chassis 400 and through the aligned one of holes 308. Threaded members 502 can be screws, bolts or other types of threaded members capable of securing fasteners 306 to chassis 400.

As each of threaded members 502 is rotated for further insertion into the corresponding holes 308, the threads of threaded members 502 exert forces on the threads of holes 308, forcing fasteners 306 toward chassis 400. Due to the off-centered location of holes 308 in fasteners 306, a cam effect is created as threaded members 502 are rotated. The movement of fasteners 306 allowed by pins 312 in grooves 310 prevents frame 300 from deflecting.

When each of fasteners 306 comes into contact with chassis 400, the cam mechanism configuration created by threaded members 502 and fasteners 306 causes each fastener 306 to rotate until stopped by inner surfaces of frame 300 exposed to voids 302. When a particular fastener is fully tightened against the surface of chassis 400 and against an inner surface of void 302, movement of frame 300 at that location is at least partially inhibited in some directions. However, movement is allowed in a direction or directions parallel to the direction that the particular fastener 306 is inserted into the corresponding void 302. In other words, each fastener individually secures frame 300 to a particular portion of chassis 400 while allowing frame 300 and chassis 400 to move slightly toward and away from each other in at least one direction. This prevents the transfer of forces to the frame as the threaded members are tightened. Thus, each fastener partially secures frame 300 to chassis 400 without deflecting frame 300 toward chassis 400 due to the clearance between the chassis and the frame.

Figure 6:
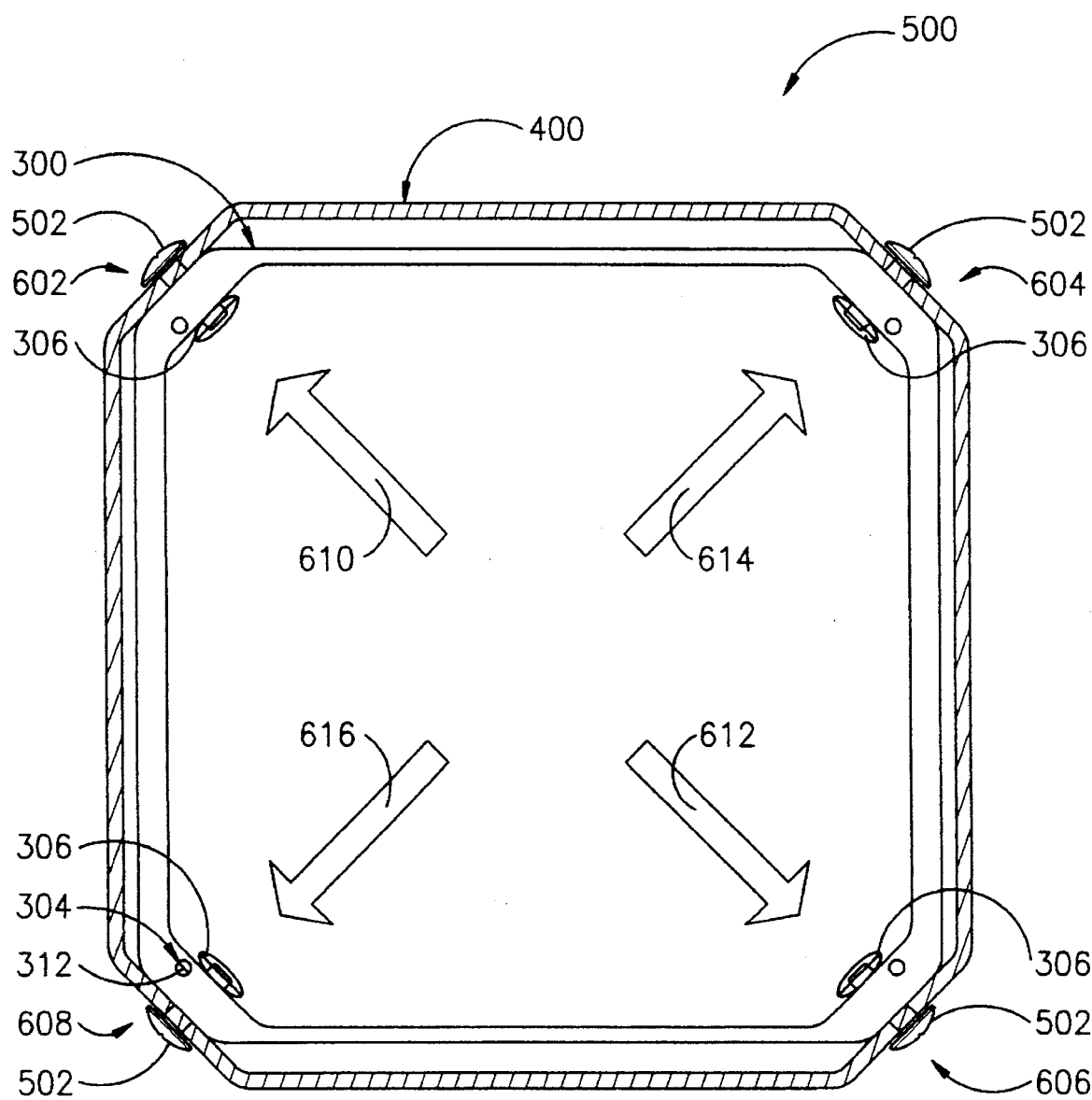
FIG. 6 is a rear view, with portions shown in section, of the LCD and mount of the present invention.

FIG. 6 is a rear view, with portions shown in section, of LCD assembly 500, illustrating the directions of movement prohibited and allowed by each of a plurality of securing mechanisms. As shown, frame 300 is secured to chassis 400 by securing mechanisms 602, 604, 606 and 608. As discussed with reference to FIGS. 3–5 above, each of mechanisms 602, 604, 606 and 608 includes one fastener receiving void 302 in frame 300, one pin receiving hole 304 in frame 300, one fastener 306, one pin 312, one threaded member receiving opening 402 in chassis 400, and one threaded member 502.

When fully tightened, each pair of oppositely positioned securing mechanisms prohibits movement of frame 300 relative to chassis 400 in a first direction or directions, while allowing movement of frame 300 relative to chassis 400 in a second direction or directions. For instance, securing mechanisms 602 and 606 allow movement of frame 300 relative to chassis 400 in directions indicated by arrows 610 and 612. Allowing movement in these directions prevents deflection of frame 300 toward chassis 400 at the positions of securing mechanisms 602 and 606. However, securing mechanisms 602 and 606 prohibit movement of frame 300 relative to chassis 400 in other directions, specifically in directions with directional components represented by arrows 614 and 616.

Similarly, securing mechanisms 604 and 608 allow movement of frame 300 relative to chassis 400 in directions represented by arrows 614 and 616, but prohibit movement of frame 300 in other directions, particularly directions represented by arrows 610 and 612. In this way, frame 300 will be partially prohibited from movement at these locations, but will not deflect toward chassis 400. Therefore, the combination of the first pair of securing mechanisms 602 and 606 and the second pair of securing mechanism 604 and 608 substantially prohibit movement of frame 300 relative to chassis 400 in any direction with a directional component represented by arrows 610, 612, 614 or 616.

It is believed that the cam effect of the fully secured fasteners against chassis 400 inhibits movement of frame 300 relative to chassis 400 in directions perpendicular to all of arrows 610, 612, 614 and 616 (directions into and out of the plane of the page). Therefore, movement of frame 300 relative to chassis 400 can be completely or substantially eliminated in all directions without deflecting frame 300 outward toward chassis 400. Consequently, stresses will not be transferred to the liquid crystal and Newton rings will not occur.

An additional advantageous feature derived from the floating mount configuration of the present invention is the self centering of the LCD frame within the chassis. The center points of the frame and chassis, as determined by the intersection of lines drawn between opposite pairs of mounting holes, will coincide. The floating mount fastener surfaces move outward to align with the mounting holes of the chassis. Therefore, since the LCD frame and chassis mounting surfaces are shared, the center of the LCD frame and chassis will be the same.

While particular embodiments of the present invention have been shown and described, it should be clear that changes and modifications may be made to such embodiments without departing from the true scope and spirit of the invention. For instance, more or less than four total securing mechanisms can be used. Also, the particular configuration of the securing mechanisms can be altered to achieve the same result. It is intended that the appended claims cover all such changes and modifications.

We claim:

1. A liquid crystal display mount comprising:

a frame having a first fastener receiving void and a first pin receiving aperture, the first pin receiving aperture at least partially intersecting the first fastener receiving void;

a first fastener having a first threaded member receiving hole and having a first pin receiving void, the first fastener being positionable in the first fastener receiving void such that the first pin receiving aperture is aligned with the first pin receiving void;

a first pin extending through the first pin receiving aperture and into the first pin receiving void to movably couple the first fastener to the frame and to inhibit complete rotation of the first fastener in the first fastener receiving void;

a chassis having a first threaded member receiving opening alignable with the first threaded member receiving hole when the first fastener is positioned in the first fastener receiving void of the frame; and a first threaded member insertable through the first threaded member receiving opening and into the first threaded member receiving hole such that a distance between the first fastener and the chassis is reduced, thereby at least partially securing the frame to the chassis.

2. The liquid crystal display mount of claim 1 wherein the distance between the first fastener and the chassis is reduced to the extent that the first fastener is in contact with the chassis, thereby inhibiting movement of the frame relative to the chassis in a first direction but allowing movement of the frame relative to the chassis in a second direction non-parallel to the first direction.

3. The liquid crystal display mount of claim 2 wherein the first fastener receiving void and the first fastener are substantially circular in shape.

4. The liquid crystal display mount of claim 2 wherein the first threaded member receiving hole is positioned off-center in the first fastener such that the first fastener acts as a cam and the first threaded member acts as a camshaft, rotation of the first threaded member causing the first fastener to rotate non-eliptically until further rotation is inhibited by at least one of the frame and the first pin, thereby inhibiting movement of the frame relative to the chassis in the first direction.

5. The liquid crystal display mount of claim 2 wherein the second direction is perpendicular to the first direction.

6. A liquid crystal display assembly comprising:

a liquid crystal;

a frame coupled to the liquid crystal, the frame having first and second fastener receiving apertures and first and second pin receiving holes, the first pin receiving hole at least partially intersecting the first fastener receiving aperture, and the second pin receiving hole at least partially intersecting the second fastener receiving aperture;

a first fastener having a first threaded member receiving hole and a first pin receiving void, the first fastener being positionable in the first fastener receiving aperture such that the first pin receiving void is aligned with the first pin receiving hole;

a second fastener having a second threaded member receiving hole and second pin receiving void, the second fastener being positionable in the second fastener receiving aperture such that the second pin receiving void is aligned with the second pin receiving hole;

a first pin insertable in the first pin receiving hole and in the first pin receiving void to couple the first fastener to the frame and to prohibit complete rotation of the first fastener while the first fastener is positioned in the first fastener receiving aperture;

a second pin insertable in the second pin receiving hole and in the second pin receiving void to couple the second fastener to the frame and to prohibit complete rotation of the second fastener while the second fastener is positioned in the second fastener receiving aperture;

a chassis adapted for receiving the frame, the chassis having first and second threaded member receiving apertures, the first threaded member receiving aperture being alignable with the first threaded member receiving hole, and the second threaded member receiving aperture being alignable with the second threaded member receiving hole;

a first threaded member insertable in the first threaded member receiving aperture and in the first threaded member receiving hole for securing the first fastener to the chassis and thereby at least partially securing the frame to the chassis; and a second threaded member insertable in the second threaded member receiving aperture and in the second threaded member receiving hole for securing the second fastener to the chassis and thereby at least partially securing the frame to the chassis.

7. The liquid crystal display assembly of claim 6 wherein securing the first and second fasteners to the chassis inhibits movement of the frame relative to the chassis in a first direction but allows at least partial movement of the frame relative to the chassis in a second direction.

8. The liquid crystal display assembly of claim 7 wherein the first and second fastener receiving apertures are disposed in opposing positions on the frame from one another.

9. The liquid crystal display assembly of claim 6 wherein securing the first fastener to the chassis inhibits movement of the frame relative to the chassis in a first direction, but allows at least partial movement of the frame relative to the chassis in a second direction, and wherein securing the second fastener to the chassis inhibits movement of the frame relative to the chassis in the second direction, but allows movement of the frame relative to the chassis in the first direction.

10. The liquid crystal display assembly of claim 6, wherein the frame further includes third and fourth fastener receiving apertures, a third pin receiving hole which at least partially intersects the third fastener receiving aperture and a fourth pin receiving hole which at least partially intersects the fourth fastener receiving aperture, and wherein the chassis further includes third and fourth threaded member receiving apertures, the liquid crystal display assembly further comprising:

a third fastener having a third threaded member receiving hole and a third pin receiving void, the third fastener being positionable in the third fastener receiving aperture such that the third pin receiving void is aligned with the third pin receiving hole;

a fourth fastener having a fourth threaded member receiving hole and a fourth pin receiving void, the fourth fastener being positionable in the fourth fastener receiving aperture such that the fourth pin receiving void is aligned with the fourth pin receiving hole;

a third pin insertable in the third pin receiving hole and in the third pin receiving void to couple the third fastener to the frame and to prohibit complete rotation of the third fastener while the third fastener is positioned in the third fastener receiving aperture;

a fourth pin insertable in the fourth pin receiving hole and in the fourth pin receiving void to couple the fourth fastener to the frame and to prohibit complete rotation of the fourth fastener while the fourth fastener is positioned in the fourth fastener receiving aperture;

a third threaded member insertable in the third threaded member receiving aperture and in the third threaded member receiving hole for securing the third fastener to the chassis and thereby at least partially securing the frame to the chassis; and a fourth threaded member insertable in the fourth threaded member receiving aperture and in the fourth threaded member receiving hole for securing the fourth fastener to the chassis and thereby at least partially securing the frame to the chassis.

11. The liquid crystal display assembly of claim 10 wherein securing the first and second fasteners to the chassis inhibits movement of the frame relative to the chassis in a first direction, but allows movement of the frame relative to the chassis in a second direction non-parallel to the first direction, and wherein securing the third and fourth fasteners to the chassis inhibits movement of the frame relative to the chassis in the second direction, but allows movement of the frame relative to the chassis in the first direction, such that securing the first, second, third and fourth fasteners to the frame prohibits movement of the frame relative to the chassis in both of the first and second directions.

12. A display comprising:

a frame;

a chassis adapted for receiving the frame;

first and second connecting mechanisms coupled to the frame and to the chassis for at least partially securing the frame to the chassis by prohibiting movement of the frame to the chassis in a first direction, the first and second connecting mechanisms allowing at least partial movement of the frame relative to the chassis in a second direction non-parallel to the first direction; and, the first and second connecting mechanisms allow at least partial movement of the frame relative to the chassis in the second direction so that the frame does not deflect outward toward the chassis in the second direction.

13. The display of claim 12 wherein the first direction is substantially perpendicular to the second direction.

14. The display of claim 2 and further comprising:

third and fourth connecting mechanisms coupled to the frame and to the chassis for at least partially securing the frame to the chassis by prohibiting movement of the frame relative to the chassis in the second direction, the third and fourth connecting mechanisms allowing at least partial movement of the frame relative to the chassis in the first direction.

15. The display of claim 14 wherein the third and fourth connecting mechanisms allow at least partial movement of the frame relative to the chassis in the first direction so that the frame does not deflect outward toward the chassis in the first direction, the first and second connecting mechanisms and the third and fourth connecting mechanisms together prohibiting movement of the frame relative to the chassis in both of the first and second directions.

16. The display of claim 15 wherein the first and second connecting mechanisms are positioned opposite one another on the display and wherein the third and fourth connecting mechanisms are positioned opposite one another on the display.

17. A liquid crystal display assembly comprising:

a liquid crystal;

a frame coupled to the liquid crystal, the frame having first, second, third and fourth fastener receiving apertures and having first, second, third and fourth pin receiving holes, the first pin receiving hole at least partially intersecting the first fastener receiving aperture, the second pin receiving hole at least partially intersecting the second fastener receiving aperture, the third pin receiving hole at least partially intersecting the third fastener receiving aperture, and the fourth pin receiving hole at least partially intersecting the fourth fastener receiving aperture;

a first fastener having a first threaded member receiving hole and a first pin receiving void, the first fastener being positionable in the first fastener receiving aperture such that the first pin receiving void is aligned with the first pin receiving hole;

a second fastener having a second threaded member receiving hole and a second pin receiving void, the second fastener being positionable in the second fastener receiving aperture such that the second pin receiving void is aligned with the second pin receiving hole;

a third fastener having a third threaded member receiving hole and a third pin receiving void, the third fastener being positionable in the third fastener receiving aperture such that the third pin receiving void is aligned with the third pin receiving hole;

a fourth fastener having a fourth threaded member receiving hole and a fourth pin receiving void, the fourth fastener being positionable in the fourth fastener receiving aperture such that the fourth pin receiving void is aligned with the fourth pin receiving hole;

a first pin insertable in the first pin receiving hole and in the first pin receiving void to couple the first fastener to the frame and to prohibit complete rotation of the first fastener while the first fastener is positioned in the first fastener receiving aperture;

a second pin insertable in the second pin receiving hole and in the second pin receiving void to couple the second fastener to the frame and to prohibit complete rotation of the second fastener while the second fastener is positioned in the second fastener receiving aperture;

a third pin insertable in the third pin receiving hole and in the third pin receiving void to couple the third fastener to the frame and to prohibit complete rotation of the third fastener while the third fastener is positioned in the third fastener receiving aperture;

a fourth pin insertable in the fourth pin receiving hole and in the fourth pin receiving void to couple the fourth fastener to the frame and to prohibit complete rotation of the fourth fastener while the fourth fastener is positioned in the fourth fastener receiving aperture;

a chassis adapted for receiving the frame, the chassis having first, second, third and fourth threaded member receiving apertures, the first threaded member receiving aperture being alignable with the first threaded member receiving hole, the second threaded member receiving aperture being alignable with the second threaded member receiving hole, the third threaded member receiving aperture being alignable with the third threaded member receiving hole, and the fourth threaded member receiving aperture being alignable with the fourth threaded member receiving hole;

a first threaded member insertable in the first threaded member receiving aperture and in the first threaded member receiving hole for securing the first fastener to the chassis and thereby at least partially securing the frame to the chassis;

a second threaded member insertable in the second threaded member receiving aperture and in the second threaded member receiving hole for securing the second fastener to the chassis and thereby at least partially securing the frame to the chassis;

a third threaded member insertable in the third threaded member receiving aperture and in the third threaded member receiving hole for securing the third fastener to the chassis and thereby at least partially securing the frame to the chassis; and a fourth threaded member insertable in the fourth threaded member receiving aperture and in the fourth threaded member receiving hole for securing the fourth fastener to the chassis and thereby at least partially securing the frame to the chassis, wherein securing the first and second fasteners to the chassis inhibits movement of the frame relative to the chassis in a first direction, but allows movement of the frame relative to the chassis in a second direction non-parallel to the first direction, and wherein securing the third and fourth fasteners to the chassis inhibits movement of the frame relative to the chassis in the second direction, but allows movement of the frame relative to the chassis in the first direction, such that securing the first, second, third and fourth fasteners to the chassis prohibits movement of the frame relative to the chassis in both of the first and second directions.

18. A display mount comprising:

a frame having a plurality of fastener receiving holes and a plurality of pin receiving apertures associated with and intersecting each of the plurality of fastener receiving holes;

a fastener, having a void and a groove defined therein, disposed in each of the plurality of fastener receiving holes such that the groove of each fastener is aligned with a corresponding pin receiving aperture;

a pin disposed in each of the plurality of pin receiving apertures and in the groove of a corresponding fastener;

a chassis having a plurality of threaded member receiving holes, each threaded member receiving hole being alignable with the void of the corresponding fastener; and a threaded member extending through each of the threaded member receiving holes and disposed in the void of the corresponding fastener to couple the fastener to the chassis.

19. The display mount of claim 18 wherein the pin disposed in each of the plurality of pin receiving apertures and in the grooves of the corresponding fasteners movably couples the corresponding fasteners to the frame, wherein movably coupling each fastener to the frame prevents deflection of the frame as each of the plurality of fastener is coupled to the chassis.

20. A display comprising:

a frame;

a chassis adapted for receiving the frame, a clearance distance existing between the chassis and the frame when the chassis has received the frame;

first means for securing the frame to the chassis without deflecting the frame toward the chassis in the clearance area; and, second means for securing the frame to the chassis without deflecting the frame toward the chassis in the clearance area, wherein the first means for securing prohibits movement of the frame relative to the chassis in a first direction but allows movement of the frame relative to the chassis in a second direction, and wherein the second means for securing prohibits movement of the frame relative to the chassis in the second direction but allows movement of the frame relative to the chassis in the first direction.

\* \* \* \* \*